(No Model.)  2 Sheets—Sheet 2.
C. E. BUELL.
Apparatus for Using Compressed Air.
No. 234,751.  Patented Nov. 23, 1880.
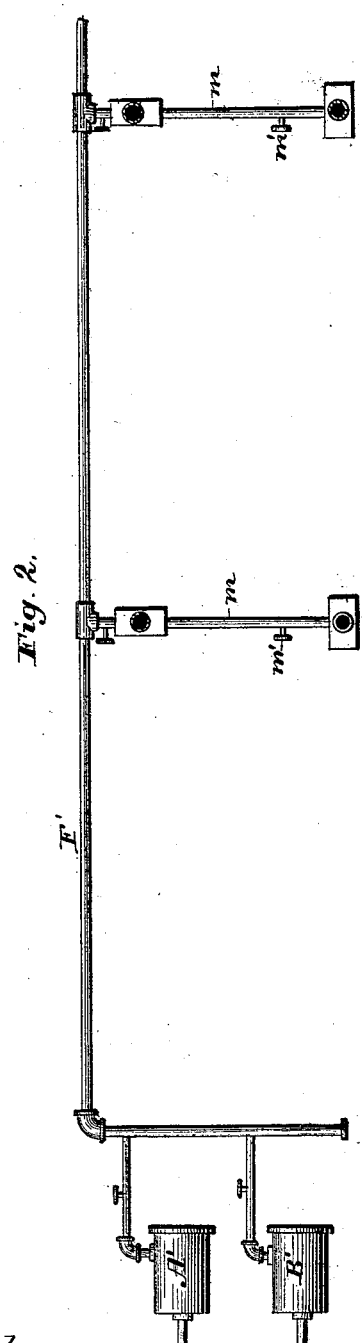
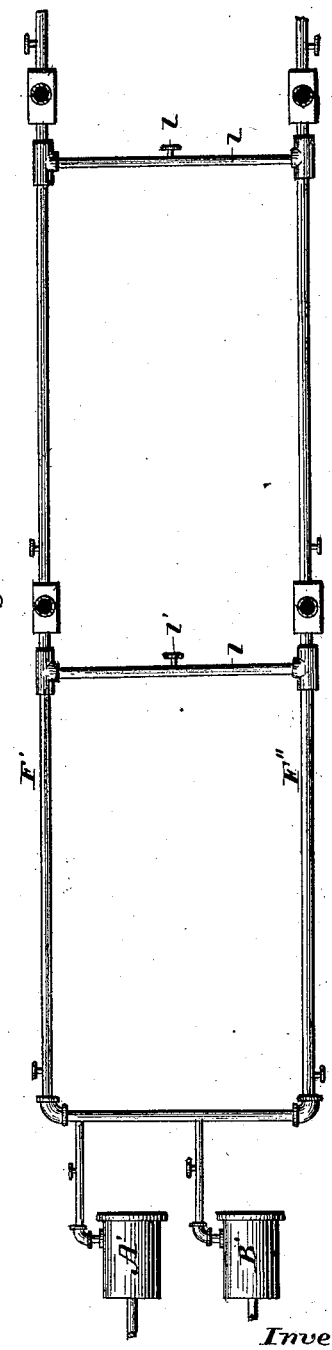
Attest:
J. Henry Kaiser.
Albert H. Norris.
Inventor,
Charles E. Buell
By James L. Norris
Atty.

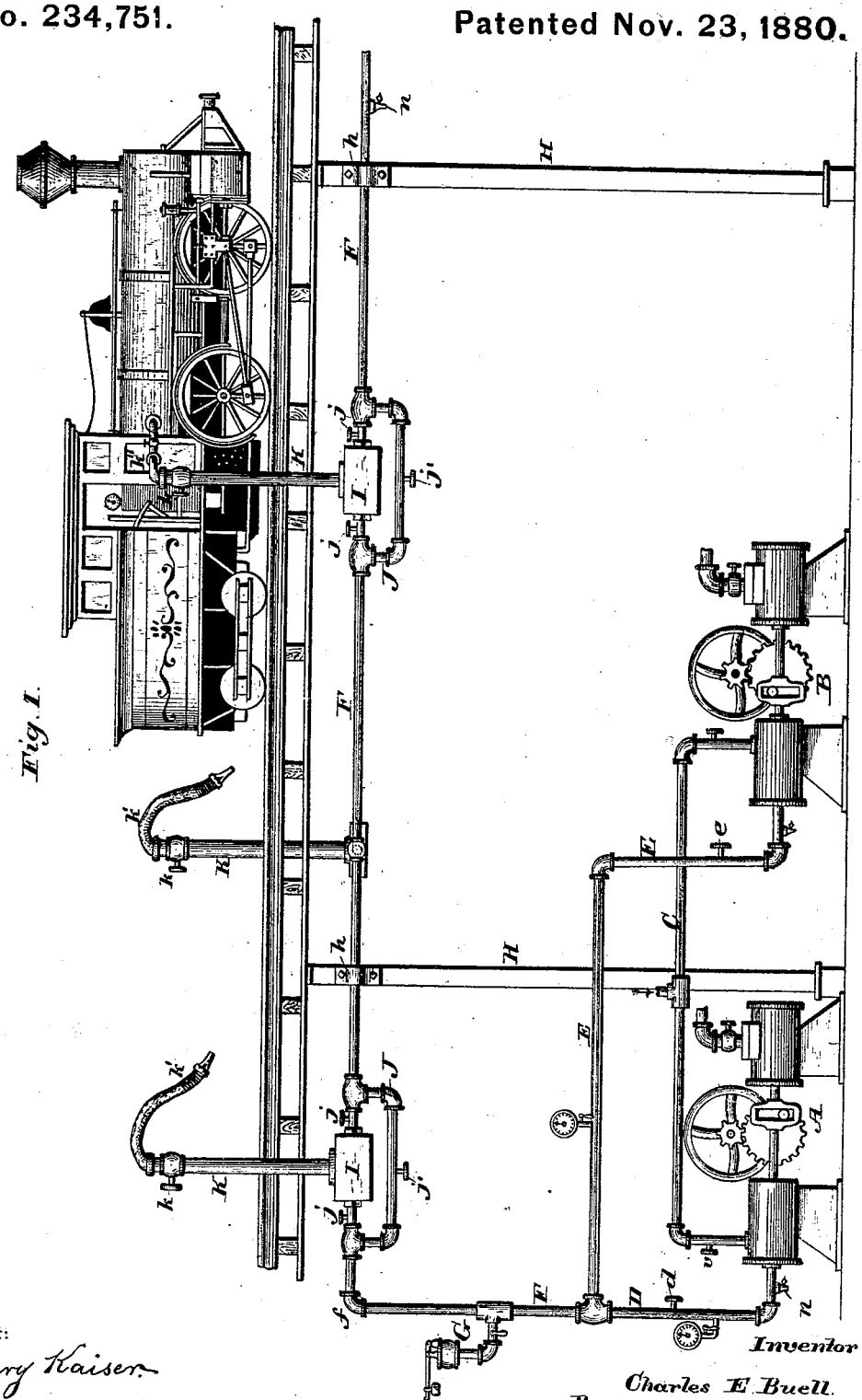

UNITED STATES PATENT OFFICE.

CHARLES E. BUELL, OF NEW HAVEN, CONNECTICUT.

APPARATUS FOR USING COMPRESSED AIR.

SPECIFICATION forming part of Letters Patent No. 234,751, dated November 23, 1880.

Application filed September 7, 1880. (No model.)

*To all whom it may concern:*

Be it known that I, CHARLES E. BUELL, of the city of New Haven, in the county of New Haven and State of Connecticut, have invented certain new and useful Improvements in Apparatus for Using Compressed Air, of which the following is a specification, reference being made to the accompanying drawings.

The objects of my invention are to provide against the loss and inconvenience heretofore resulting from the getting out of order of the compressing apparatus; to provide for the use of small-sized mains for conducting compressed air, and to facilitate the connection and disconnection of motors and air holders or reservoirs with a system of pipes used to conduct compressed air.

It frequently happens that an air-compressing pump and its connections become so much out of order as to necessitate their disuse while being repaired, and at such times the supply of compressed air through the mains, of course, ceases, and the motors connected with said mains must remain idle until the repairs are finished, a great loss and inconvenience being thus caused. I prevent this loss and inconvenience by providing two sets of compressing apparatus and devices by which either of said sets may be operatively connected with the main or mains, as desired, as hereinafter fully described.

It has heretofore been necessary to use large-sized mains for conducting compressed air, on account of the impeding or clogging of the air under high pressure in small-sized pipes, the mains heretofore used being much larger than necessary were it not for such clogging.

I have obviated the clogging of the air in small-sized mains by interposing at intervals in said small-sized mains enlarged chambers or air-holders, which relieve the mains of the impacting or over-compression which causes the clogging, and I have provided for the cutting off of the air from any number of said chambers or holders without interrupting the supply to other points, all of which will be hereinafter described.

Motors operated by compressed air are frequently moved from place to place, rendering it often inconvenient to connect with the mains by means of rigid branch pipes. Especially is the inconvenience felt in the case of motors used for propelling railway-cars, which it is difficult to always stop at a particular point in order to connect with the main. I have overcome this difficulty by using flexible or jointed connecting-pipes, which may be either permanently attached to the motors or to branch pipes leading from the mains, and connected with either, as desired.

In the accompanying drawings, which illustrate the principle and an effective arrangement of devices for carrying my invention into effect, Figure 1 is a view, in elevation, of two sets of air-compressing apparatus and a main arranged to supply compressed air to the locomotives or motors for propelling cars upon an elevated railway. Figs. 2 and 3 are plan views illustrating the arrangement of the mains.

The letters A and B indicate, respectively, two air-compressing pumps, the cylinders of which are connected by a pipe, C, for a purpose to be hereinafter explained. These pumps are, respectively, connected to the main F by means of pipes D and E, the pipe D being provided with a cut-off, *d*, and the pipe E with a similar cock, *e*. The main F may have connected with it at any convenient point a safety-valve, as shown at G, preferably at the station where the compressing-pumps are located. The main F is mainly supported by the pillars H, which support the railway, being secured to said pillars by brackets *h*, and it is bent by a suitable elbow, as at *f*, to connect with the pumps. But one of the pumps is necessary to keep the main properly supplied with compressed air, and by means of the cut-off cock in its branch pipe either of said pumps may be connected with a cut-off from the main independently of the other, as will be readily understood, so that in case one of the pumps should get out of order it may be disconnected from the main for repair, while the other pump may be connected to supply the main with compressed air, loss of time and inconvenience being thus prevented. At intervals in the main F are interposed chambers I, having a greater diameter than said main, and connected thereto. These enlarged chambers, being arranged at proper distance apart, permit expansion of the air at these points, and thus afford relief for the over-pressure or clogging which occurs in small pipes. From points in the main near the opposite ends of each chamber I, branch pipes J lead around chambers, forming laps; and between the ends of the chambers and the junctions of these branch pipes with the main are arranged cut-off cocks $j$, by the closing of which the air may be diverted from the main through these branch pipes, and thus pass around the chambers I any one or more of which may thus be cut off from the main for repair or other purpose without interrupting the supply of air to other points. The branch pipes J are themselves provided with cut-off cocks $j'$, by means of which the air may be prevented from flowing through them when desired.

From intermediate points of the main, preferably from the chamber I, stand-pipes K lead to a suitable height, and are provided with cut-off cocks $k$. These stand-pipes serve as supply-pipes for the motor or locomotive, and each is provided with a flexible extension, $k'$, terminated by a coupling device adapted to connect with a corresponding device arranged at the end of a receiving-pipe, $k''$, with which the air-reservoir of the locomotive is provided, said receiving-pipe being provided with a suitable cock or valve. Instead of being flexible throughout, the extension may be made flexible by being composed of rigid pipe-sections jointed together. By means of this flexible extension of the supply-pipes I obviate the necessity of bringing the locomotive to the same precise point with relation to the supply-pipe every time the reservoir is to be replenished, as it is obvious that the flexible pipe may be led to the locomotive at whatever point it may be stopped.

In case of the application of my invention to double-track railways the main may be composed of two branches, one arranged along the outside of each track, as shown at $F'$ $F''$, Fig. 3, these branches leading from the same pump, and preferably connected at intervals by cross-pipes $l$, supplied with cut-off cocks $l'$. By closing two of the cocks at any given points in one of the branches and opening suitable cocks $l'$ of the cross-pipes, any section of said branch between two cocks may be cut off from the air-supply without interrupting the supply to the other portions. Instead, however, of using two branches, as shown in Fig. 3, a single main may be used, as in Fig. 2, and cross-branches $m$ may be used to connect with stand-pipes $K'$, properly arranged upon the outside of the opposite track, said cross-branches being supplied with cut-off cocks $m'$, for obvious use.

The main or mains may be provided with suitable stop-cocks, as at $n$, for carrying off condensed moisture; and pressure-indicators, as at $o$, may be connected with any portion of the main or its branches.

Recurring to the pipe C, connecting the air-cylinders of the pumps A B, this pipe is provided with a branch pipe, $C'$, which it is proposed to connect with a reservoir kept constantly supplied with compressed air by any suitable means, so that the air-pressure from this reservoir may be added to that produced in the pump-cylinders. Small-sized cylinders may thus be used and a high pressure produced in the main. Small-sized cylinders have been found preferable to large ones in air-compressing apparatus, as is well known.

I am aware that a compressed-air pipe has been extended under a railroad-track, and provided with outlets at suitable intervals, so that air may be supplied to a moving reservoir at various points on the road, and I do not claim such arrangement, broadly.

What I claim is—

1. In an apparatus for supplying compressed air, the combination, with a single air-main, of two air-compressing pumps, and means by which either one of said pumps may be connected to or disconnected from said main independently of the other, substantially as described.

2. The combination, with a compressed-air main, of a series of chambers or enlarged portions arranged in said main, substantially as and for the purpose set forth.

3. The combination, with a compressed-air main and a locomotive, of one or more branch supply-pipes made flexible or jointed to admit of supplying the locomotive when in different positions, and adapted to make hasty and air-tight connection between said main and locomotive, and means for letting on and cutting off the air-supply at two points in the connection thus formed, substantially as described.

4. The combination, with the main and interposed chambers or enlarged portions, of the branch pipe leading around said chambers, and suitable cocks arranged in the main for diverting the air from the chambers to said branch pipes, substantially as and for the purpose set forth.

5. The combination, with the pillars H, of the mains, and means for securing said mains to said pillars, substantially as set forth.

CHARLES E. BUELL.

Witnesses:
A. C. WHITE, Jr.,
W. STERLING YARD.